United States Patent Office 2,757,737
Patented Aug. 7, 1956

2,757,737

METHOD OF PREVENTING LOST CIRCULATION

Frederic W. Schremp, Fullerton, Calif., assignor to California Research Corporation, San Francisco, Calif., a corporation of Delaware No Drawing. Application April 24, 1953,
Serial No. 351,026

4 Claims. (Cl. 166—33)

The present invention relates generally to well drilling, such as the drilling of oil wells for the production of crude petroleum. More particularly, the invention is directed to a method for remedying the loss of drilling fluid into large-pored and fractured formations during such drilling.

In the practice of rotary drilling, such as carried out in the drilling of oil and gas wells, a mud or clay-laden fluid is circulated into the bore hole to remove the cuttings, to assist in the drilling and to lubricate and cool the bit during the drilling. Where it is necessary to drill through large-pored or fractured formations, it is desirable to seal off such formations so that the drilling fluid will be retained in the hole to perform its required functions.

One solution to this lost circulation problem proposed the use of a hydratable bentonite clay in an oil carrier. The oil serves as a non-aqueous carrier for the clay to prevent hydration thereof until the mixture is located in the lost circulation zone. The mixture is then interacted with connate water in the surrounding formation or with a water-base drilling fluid to cause hydration of the clay and consequent plugging of the formation. Most of the oil, being substantially immiscible with water, is carried away by the drilling fluid and returned to the surface.

However, this method has the disadvantage that some of the oil remains in the hydrated mixture and acts as a diluent therefor, with a consequent undesirable reduction in the yield strength of the hydrated mixture as compared with the yield strength of an undiluted hydrated mixture. The above mixture has the further disadvantage that the oil which is returned to the surface in the drilling fluid fluoresces and thus produces interference with mud logging in exploratory wells.

Broadly, the present invention contemplates the use of a hydratable material and a binding agent in a non-fluorescing carrier as a lost circulation remedial mixture. In particular, the present invention contemplates a lost circulation remedial mixture comprising a hydratable material and a resinous binding agent in a water-miscible carrier, in which the binding agent increases the yield strength of the hydratable material upon hydration thereof.

It is, therefore, an object of the present invention to provide an improved method and mixture for remedying lost circulation in the drilling of a well bore.

It is an additional object of this invention to provide a mixture for remedying lost circulation in a well bore comprising a hydratable material and a binding agent in a water-miscible carrier.

It is a further object of the present invention to provide a mixture for remedying lost circulation in a well bore comprising a hydratable material and a binding agent in which the binding agent substantially increases the yield strength of the hydrated mixture.

Accordingly, the present invention may be described briefly as embodying the steps of forming a mixture comprising a hydratable material, a binding agent and a water-miscible carrier, introducing the mixture into the well bore adjacent to and in contact with the lost circulation zone, and interacting the mixture with water to hydrate the hydratable material.

Any suitable well-known hydratable material may be used, but preferably bentonite clay is employed because of its desirable swelling properties upon hydration. The binding agent may comprise any suitable known resin, including polyvinyl resins (i. e., Vinylites) such as polyvinyl chloride and polyvinyl acetate, and cellulose derivatives and plastics such as cellulose acetate, ethyl cellulose, cellulose nitrate, cellulose acetate propionate, and cellulose acetate butyrate. However, I prefer to use polyvinyl acetate because of its elasticity and high wet strength.

Similarly, suitable water-miscible solvents selected from the group consisting of water-miscible alcohols, ketones and esters, such as diethylene glycol, ethyl lactate, ethylene chlorohydrin, methyl Cellosolve (Cellosolve being a trade designation for glycol ethyl ether), methyl Cellosolve acetate and methyl ethyl ketone may be employed, but in the preferred embodiment of the invention, acetone is used as a carrier.

As examples of mixtures finding use in the present invention, a mixture containing from 150 to 300 pounds of ground dry bentonite clay, from 2.8 to 22.7 pounds of polyvinyl acetate and from 275 to 261 pounds of acetone, has very satisfactory plugging characteristics. The concentration of polyvinyl acetate in acetone in this mixture may vary from 1 to 8% by weight, and the preferred concentration of polyvinyl acetate in acetone is between 2 and 5% by weight. Any concentration between 1% and 8% polyvinyl acetate in acetone, when mixed with bentonite in the above proportions and hydrated with water, will produce plastic masses of polyvinyl acetate-bentonite having yield strengths equal to or greater than that possessed by a comparable hydrated oil-bentonite mixture.

The following table shows the results of yield strength tests on hydrated mixtures of various proportions of polyvinyl acetate, acetone and bentonite as compared with the yield strength of a hydrated mixture of diesel oil and bentonite. All of the mixtures were adjusted to have a viscosity before hydration in the range between 35 and 40 centipoises, which corresponds to the viscosity range of diesel oil-bentonite mixtures now being used in the field. After the unhydrated mixtures were prepared, water was added to each mixture in an amount equal in weight to that of the dry bentonite present in each mixture. Each mixture was then thoroughly agitated, placed in a sealed container, and allowed to hydrate for 24 hours before testing.

| Mixture | Polyvinyl Acetate to Acetone Ratio, Percent by weight | Viscosity (cp.) | Average Yield Strength (p. s. i.) | Weight of Bentonite per 1000 cc. of Diesel Oil or Acetate-Acetone (grams) |
|---|---|---|---|---|
| Diesel Oil-Bentonite | 0–0 | (35–40) | 0.38 | 850 |
| Polyvinyl Acetate-Acetone-Bentonite | 2–98 | (35–40) | 0.90 | 627 |
| Do | 3.5–96.5 | (35–40) | 1.56 | 595 |
| Do | 5–95 | (35–40) | 1.45 | 597 |
| Do | 6–94 | (35–40) | 1.08 | 531 |

This table shows that all of the mixtures of bentonite and polyvinyl acetate in acetone in which the polyvinyl acetate is present in amounts between 2 and 6 per cent by weight of the total polyvinyl acetate and acetone have a yield strength in excess of that of the diesel oil-bentonite combination, and that such mixtures in which the polyvinyl acetate is present in amounts between 3.5 and 5 per cent by weight of the total polyvinyl acetate and acetone have a yield strength in excess of three times the yield strength of the diesel oil-bentonite. Thus, the above table shows that mixtures of applicant's invention are capable of plugging lost circulation openings of 3 to 4 times the size of openings which are pluggable with commercially-used mixtures of diesel oil-bentonite, and, further, that for a lost circulation opening of a given size, only a third or a quarter as much of applicant's mixture is required to plug the opening as is required with the diesel oil-bentonite mixture.

The method of application of the above-described mixture to the lost circulation zone may vary, but the preferred method of application is to spot the mixture in the lost circulation zone and then squeeze the mixture into the pores of the lost circulation zone through application of suitable pressure. When the mixture is in position, it may be interacted with water, either from the surrounding formation or by introducing water into the hole, such as water-base drilling fluid.

The improved properties of the above mixture as a lost circulation remedial mixture are due to the binding action on the particles of hydrated material by the binding agent. When the mixture is prepared, the polyvinyl acetate coats the particles of the unhydrated material while the water-miscible solvent serves to maintain pumpability of the mixture to facilitate delivery thereof to the lost circulation zone. When the mixture comes in contact with water, either from connate formation water or from a water-base drilling fluid, the polyvinyl acetate is precipitated from the acetone and the particles of the hydratable material are swelled by the water. Since there is intimate contact between the hydratable particles and the polyvinyl acetate, there results a swelled mass of clay which is held together by the precipitated vinyl resin. Substantially all of the polyvinyl acetate remains in the zone of loss with the hydrated material, and most of the water-miscible carrier is released to the mud stream. Since acetone does not fluoresce when exposed to ultraviolet light, the presence of the acetone in the mud stream will not interfere with ultraviolet mud logging as would oil.

I claim:

1. The method of remedying lost circulation in a well bore comprising the steps of forming a mixture of a hydratable clay and a polyvinyl resinous binding agent in a water-miscible carrier, introducing said mixture into the zone of lost circulation, and interacting said mixture with water to hydrate said clay and to precipitate said polyvinyl resin binding agent to consolidate said clay.

2. The method of remedying lost circulation in a well bore comprising the steps of forming a mixture of a hydratable clay and a polyvinyl resinous binding agent in an acetone carrier, introducing said mixture into said well bore adjacent to the lost circulation zone, and interacting said mixture with water to hydrate said clay and to precipitate said polyvinyl resin binding agent to consolidate said clay.

3. The method of remedying lost circulation in a well bore comprising the steps of forming a mixture of bentonite clay and polyvinyl acetate in an acetone carrier, introducing said mixture into said well bore adjacent to the lost circulation zone, and interacting said mixture with water to hydrate said clay and to precipitate said polyvinyl acetate to consolidate said clay.

4. The method of remedying lost circulation in a well bore comprising the steps of forming a mixture of bentonite clay and polyvinyl chloride in a water-miscible carrier, introducing said mixture into said well bore adjacent to the lost circulation zone and interacting said mixture with water to hydrate said clay and to precipitate said polyvinyl chloride to consolidate said clay.

References Cited in the file of this patent

UNITED STATES PATENTS

| | | |
|---|---|---|
| 1,784,008 | Hermann et al. | Dec. 9, 1930 |
| 2,065,512 | Cannon | Dec. 29, 1936 |
| 2,265,962 | Bent et al. | Dec. 9, 1941 |
| 2,352,468 | Burnam | June 27, 1944 |
| 2,556,863 | Wrightsman | June 12, 1951 |
| 2,634,098 | Armentrout | Apr. 7, 1953 |